United States Patent [19]

Carre et al.

[11] 4,286,504
[45] Sep. 1, 1981

[54] DRUM BRAKE ACTUATING DEVICE

[75] Inventors: Jean-Jacques Carré, Montreuil; Roland Levrai, Stains, both of France

[73] Assignee: Societe Anonyme D.B.A., Drancy, France

[21] Appl. No.: 81,720

[22] Filed: Oct. 4, 1979

[51] Int. Cl.³ ............................................. F15B 11/00
[52] U.S. Cl. ........................................ 91/517; 92/75; 188/364
[58] Field of Search ............... 92/75; 188/364, 363; 60/591; 91/517

[56] References Cited

U.S. PATENT DOCUMENTS

| 2,213,948 | 9/1940 | Bowen | 188/364 |
| 2,214,951 | 9/1940 | Bock | 188/364 |
| 2,234,689 | 3/1941 | Chard | 188/364 |
| 2,385,168 | 9/1945 | Stelzer | 188/364 |
| 4,024,712 | 5/1977 | Takeuchi | 60/591 |

FOREIGN PATENT DOCUMENTS

| 1488395 | 9/1966 | France . | |
| 2219862 | 6/1974 | France . | |
| 646825 | 11/1950 | United Kingdom | 188/364 |

*Primary Examiner*—Abraham Hershkovitz
*Attorney, Agent, or Firm*—Paul David Schoenle; Terry L. Miller; Ken C. Decker

[57] ABSTRACT

A wheel cylinder comprises a bore closed by two pistons which define a pressure chamber therebetween. The pressure chamber is divided into two compartments by a partition member placed in the bore and which comprises a passage communicating the two compartments. One of the compartments is connected to a source of pressurized fluid and a control valve is mounted in the passage for controlling the pressure in the other compartment as a function of the pressure in the one compartment, whereby the wheel cylinder acts as a proportioning valve.

3 Claims, 3 Drawing Figures

FIG_1

DRUM BRAKE ACTUATING DEVICE

The invention relates to a drum brake actuating device for a motor vehicle.

Drum brake actuating devices usually comprise a hydraulic motor which urges the brake shoes apart via two pistons moving in opposite directions in a cylinder receiving a pressure liquid from a pressure source such as a hydraulic master cylinder.

In drum brakes, it is usual to call one shoe the "compressed shoe" and the other shoe the "expanded shoe", in accordance with the forces applied to the respective shoes during rotation of the wheel in the forward direction. It is well known that the brake torque is unequally divided between the expanded shoe and the compressed shoe, so that the lining on the compressed shoe wears much more rapidly than on the expanded shoe.

In rear-wheel brake circuit, it is conventional to provide a pressure-adjusting device which varies the pressure applied to the rear-wheel brake means in a predetermined manner depending on the pressure applied to the front-wheel braking means.

The object of the invention is to provide a drum brake actuating device for more evenly balancing the wear on the linings of the compressed shoe and the expanded shoe during operation, and also for adjusting the braking, allowing for the difference between the brake forces applied to the expanded and the compressed shoe.

The invention relates to a drum brake actuating device comprising a body formed with a bore, a first and a second piston being slidably disposed at the respective ends of the bore to define a pressure chamber which is divided into a first compartment and a second compartment, the first compartment being adapted to be connected to a source of pressure fluid, the actuating device also having a passage for fluid connecting the first and second compartment, a control valve being disposed in the passage to control the flow of fluid between the first and the second compartment so that the pressure in the second compartment varies in predetermined manner in dependence on the pressure in the first compartment.

According to a preferred embodiment of the invention, the control valve is normally open when the pressure of the fluid delivered by the pressure source to the first compartment is below a predetermined first value, the control valve being closed so as to cut off the flow of fluid when the pressure in the first compartment is between the first value and a second predetermined value higher than the first value, where as when the pressure of fluid in the first compartment rises above the second predetermined value, the valve responds by allowing the pressure to increase by an equal amount in the second compartment.

This feature is particularly important in the event of a failure in the brake circuit associated with the front wheels of the vehicle. In such cases, the driver can firmly press the brake pedal, thus applying most of the force of the brake associated with the rear-wheels when the pressure transmitted to the first compartment exceeds the predetermined second value.

The invention will now be described and advantages will be clear from the following description with reference to the accompanying drawings, in which.

Figure 1:
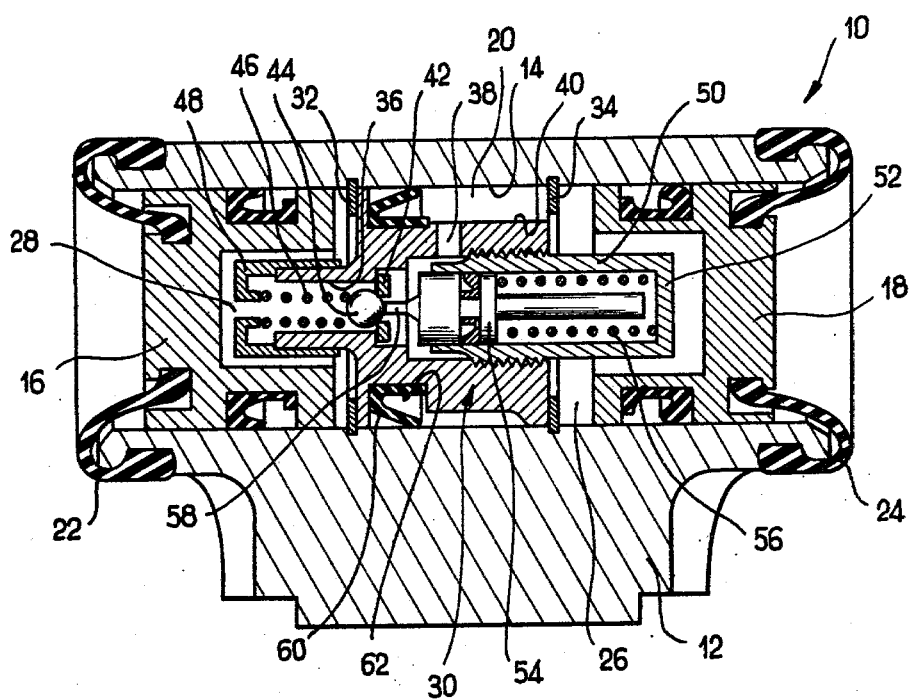
FIG. 1 shows a drum brake actuating mechanism according to the invention.

FIG. 1 shows a drum brake actuating mechanism 10 commonly known as a wheel cylinder. The wheel cylinder 10 has a casing 12 formed with a bore 14. The two ends of bore 14 are closed by pistons 16, 18 slidably mounted in sealing-tight manner in the bore so as to define a pressure chamber 20 therein. Each piston 16, 18 is adapted to apply a force to the drum brake shoe (not shown) and thus have a braking effect when the pressure fluid is transmitted to chamber 20. At each end of bore 14 there is a cap 22, 24 which co-operates with casing 12 and pistons 16, 18 respectively to protect chamber 20 from impurities.

Chamber 20 is divided into a first compartment 26 and a second compartment 28 by a separating element which in the present case is a cylindrical core 30 mounted in bore 14. Compartment 26 is adapted to be connected to a source of pressure fluid such as the chamber of a hydraulic master cylinder. Core 30 is secured in bore 14 by two circlips 32 and 34. The separating element 30 has a stepped axial bore 36 connected at one end to compartment 28 and at the other end to compartment 26 via a radial passage 38 and an annular groove 40. Bore 36 contains a valve seat 42 against which a valve or ball 44 is urged by the pressure in compartment 28 and by a first resilient element or spring 46 which bears against an abutment 48 which is stationary relative to casing 12.

Bore 36 also contains a cylinder 50 comprising an end wall 52 and axially adjustable by means of a thread in bore 36.

A piston 54 is slidably mounted in cylinder 50. One surface of piston 54 is acted upon by a second resilient element 56 which likewise comprises a spring disposed between the end wall 52 and the aforementioned surface. The other surface of the piston is subjected to the opposing action of the pressure in compartment 26 and transmitted via groove 40, radial passage 38 and bore 36.

Piston 54 also has an axial lug 58 forming a movable abutment and adapted to urge ball 44 away from seat 42 under the influence of spring 56 when the pressure in compartment 26 is below a predetermined first value.

Core 30 also comprises a ring, cup or the like 60 having a lip and mounted in groove 62 and adapted to form an anti-return valve between compartment 28 and groove 40.

The drum brake actuating device which has been described operates as follows:

In the inoperative position, there is no fluid pressure in compartment 26. Consequently, the action of spring 56 preponderates and piston 54 is urged to the left (in FIG. 1) to raise valve 44 away from its seat and thus allow fluid to flow between compartments 26 and 28.

When the brakes are applied, the fluid pressure is transmitted to compartment 26 and thus urges piston 18 against the compressed segment. Similarly, piston 16 is urged against the expanded segment. The assembly thus behaves like a conventional brake cylinder in which approximately ⅔ of the braking force is transmitted by the compressed segment and ⅓ of the braking force is transmitted by the expanded segment.

When the pressure in the compartment 26 reaches a first predetermined value, piston 54 is urged to the right against the force of spring 56, and valve 44 is urged against seat 42 by the resilient element 46, thus interrupting the flow of fluid between compartments 26 and 28. When the pressure in compartment 26 rises above the preset first value, the braking force transmitted via the expanded segment continues to increase whereas the braking force transmitted via the compressed segment is kept constant because the second compartment 28 is then isolated. In that case, the actuating device behaves like a braking compensator, which reduces the rate of increase in the total braking force when the input pressure exceeds the predetermined first value.

When the input pressure transmitted to compartment 26 exceeds a predetermined second value, above the first value, valve 44 is again raised from its seat against the action of spring 46, as a result of the pressure difference between compartments 26 and 28.

The equation of equilibrium of forces acting on ball 44 is as follows:

$$P_{28}s + F = P_{26}s$$

$$P_{28} = P_{26} - (F/s)$$

In this equation F is the force of spring 46 and s is the cross-section of valve 44. P26 and P28 are the fluid pressures in the compartments 26 and 28, respectively.

In other words, when the inlet pressure has increased beyond the predetermined second value, the pressure in compartment 28 increases by the same amount, thus maintaining a constant difference between the pressure in the first and the second compartment.

When the driver releases the brake pedal, the pressure drops in compartment 26. When the pressure becomes considerably less than the pressure in compartment 28, lip 60 tilts so that compartment 28 loses pressure. When the inlet pressure becomes equal to the predetermined first value, spring 56 urges piston 54 to the left, thus reopening communication between compartments 26 and 28.

Figure 2:
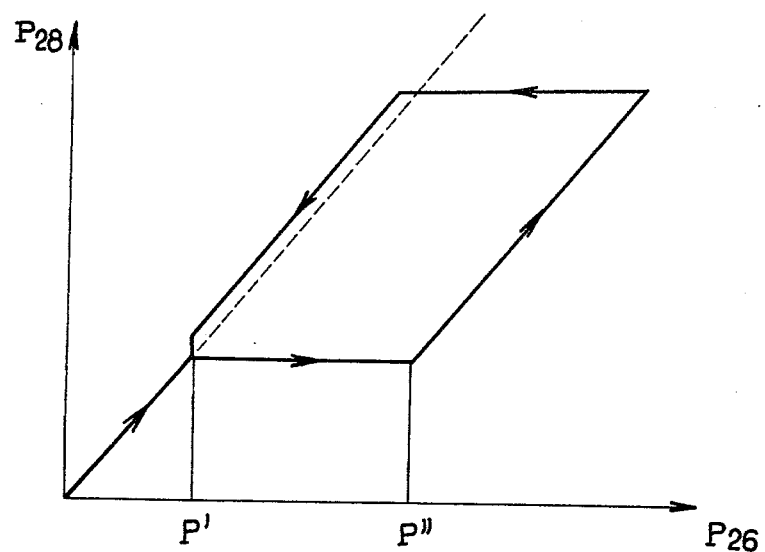
FIG. 2 is a curve illustrating the variations in pressure in a chamber of the drum brake actuating mechanism.

FIG. 2 shows a curve representing the pressure in compartment 28 in dependence on the pressure in compartment 26. As can be seen, the pressure in compartment 28 remains constant as long as the pressure in compartment 26 is between the predetermined first value P' and the predetermined second value P''.

Figure 3:
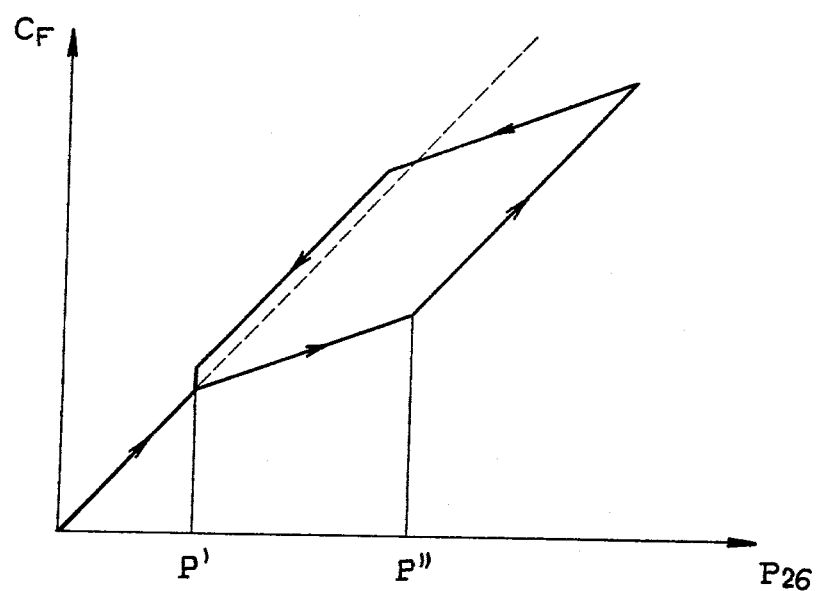
FIG. 3 is a curve illustrating the brake torque applied to the rear wheels in the dependence on the pressure from the pressure source.

FIG. 3 shows the braking torque applied by the actuating device in dependence on the pressure applied to compartment 26. As can be seen, the device behaves like a braking compensator when the inlet pressure is between P' and P''.

When the pressure from the source is high (above P''), the device according to the preferred embodiment of the invention enables most of the force of the rear-wheel brakes to be applied. This is particularly important in the event of a failure of the circuit associated with the front wheels of the vehicle, and also improves the performance of the brakes compared with a system without an adjusting means or equipped with a conventional fixed compensator.

We claim:

1. A wheel cylinder for effecting the application of a drum brake, said wheel cylinder comprising:
 a housing defining a bore therethrough adapted to receive pressurized fluid from a source of fluid pressure;
 a pair of pressure responsive pistons reciprocably received in said bore and sealingly cooperating with said housing to define a pressure chamber;
 a core member received in said chamber and dividing said pressure chamber into a pair of compartments, one of said compartments having continuous fluid communication with said source of fluid pressure, said core member including passage means for providing fluid communication between said one compartment and the other compartment;
 pressure responsive valve means disposed in said passage means for controlling the flow of pressurized fluid through said passage means as a function of the fluid pressures in said pair of compartments, said pressure responsive valve means including control means for holding said valve means open when the pressure in said one compartment is less than a first predetermined pressure, for closing said valve means when the pressure in said one compartment is greater than said first predetermined pressure and less than a second predetermined pressure, and for opening and closing said valve means to maintain a constant pressure difference between said pair of compartments in response to increasing pressure in said one compartment when the pressure in said one compartment is greater than said second predetermined pressure;
 said pressure responsive valve means including an annular valve seat and a pressure responsive valve member in a first position spaced from said valve seat, said valve member being disposed down stream of said valve seat relative to fluid flow toward said other compartment, said valve member in a second position being engageable with said valve seat to close fluid communication through said passage means, first resilient means for urging said valve member toward said second position, said core member defining a bore intersecting said passage means upstream of said valve seat, said bore receiving a cylinder member, said control means including a pressure responsive member, said pressure responsive member including a lug extending through said annular valve seat and engageable with said valve member, second resilient means disposed in said cylinder member for urging said pressure responsive member to a first position in which said lug urges said valve member to the first position thereof to open said valve means, said pressure responsive member moving to a second position retracting said lug into said annular valve seat in response to said first predetermined pressure in said one compartment so that said valve member is engageable with said valve seat to close said valve means, said valve member disengaging from said valve seat responsive to a predetermined pressure difference thereacross to communicate increasing fluid pressure to said other compartment.

2. A wheel cylinder according to claim 1 wherein said cylinder member is movable relative said core member so that said first predetermined pressure is variable by moving said cylinder relative said valve seat and valve member.

3. A wheel cylinder according to claim 1 wherein said core member defines an annular recess communicating said pair of compartments, said core member carrying a lipped seal having a resilient lip disposed toward said one compartment and sealingly engaging said housing, said lipped seal preventing fluid flow from said one compartment toward said other compartment via said recess and said resilient lip yielding responsive to a pressure differential thereacross to allow fluid flow in the opposite direction.

* * * * *